United States Patent
Watanabe (10) Patent No.: US 10,199,925 B2
(45) Date of Patent: Feb. 5, 2019

(54) OVERCURRENT PROTECTION APPARATUS (71) Applicant: ANDEN CO., LTD., Anjo, Aichi-pref. (JP)

(72) Inventor: Koichi Watanabe, Anjo (JP)

(73) Assignee: ANDEN CO., LTD., Anjo, Aichi-pref. (JP)

(*) Notice: Subject to any disclaimer, the term of this patent is extended or adjusted under 35 U.S.C. 154(b) by 0 days.

(21) Appl. No.: 15/807,757

(22) Filed: Nov. 9, 2017

(65) Prior Publication Data
US 2018/0145581 A1 May 24, 2018

(30) Foreign Application Priority Data

Nov. 24, 2016 (JP) ................ 2016-228020

(51) Int. Cl.
| H02M 1/00 | (2006.01) |
| H02M 1/32 | (2007.01) |
| H02M 3/156 | (2006.01) |
| H02M 3/155 | (2006.01) |
| H02M 1/08 | (2006.01) |
| H02M 3/157 | (2006.01) |

(52) U.S. Cl.
CPC ............. *H02M 1/32* (2013.01); *H02M 3/155* (2013.01); *H02M 3/156* (2013.01); *H02M 1/08* (2013.01); *H02M 3/157* (2013.01); *H02M 2001/0009* (2013.01)

(58) Field of Classification Search
CPC .... H02M 3/156; H02M 3/158; H02M 3/1588; H02M 2003/1566; H02M 3/155; H02M 3/1582; H02M 2003/1557
See application file for complete search history.

(56) References Cited

U.S. PATENT DOCUMENTS

| 9,871,367 B2* | 1/2018 | Ozawa ................. H02H 3/0935 |
| 2011/0216448 A1 | 9/2011 | Hisada et al. |
| 2013/0063850 A1 | 3/2013 | Kawamoto et al. |

FOREIGN PATENT DOCUMENTS

| JP | 2011-182604 A | 9/2011 |
| JP | 2013-062976 A | 4/2013 |
| JP | 2013-085443 A | 5/2013 |

* cited by examiner

*Primary Examiner* — Adolf Berhane
*Assistant Examiner* — Afework Demisse
(74) *Attorney, Agent, or Firm* — Harness, Dickey & Pierce, P.L.C.

(57) ABSTRACT

An overcurrent protection apparatus that protects, from overcurrent, a load drive system including a load circuit having an electric load and a semiconductor switch electrically connected to the load circuit so as to control a drive of the load circuit is provided. The overcurrent protection apparatus includes: an energization state acquisition part that is configured to acquire an energization state of load current flowing through the semiconductor switch and the load circuit when the semiconductor switch is ON; a change part that is configured to change an acquisition condition of the energization state at the energization state acquisition part in accordance with a driving state of the load circuit; and a protection operator that is configured to execute overcurrent protective operation of protecting the load drive system from the overcurrent based on the energization state acquired by the energization state acquisition part.

6 Claims, 7 Drawing Sheets

OVERCURRENT PROTECTION APPARATUS

CROSS REFERENCE TO RELATED APPLICATIONS

This application is based on Japanese Patent Application No. 2016-228020 filed on Nov. 24, 2016, the disclosure of which is incorporated herein by reference.

TECHNICAL FIELD

The present disclosure relates to an overcurrent protection apparatus that is configured to protect, from overcurrent, a load drive system including a load circuit having an electric load.

BACKGROUND ART

Patent Literature 1: JP 2013-85443 A (corresponding to US 2013/0063850 A).

Apparatus protecting from overcurrent based on detected load current has been provided (see Patent Literature 1).

The inventor of the present application has found the following.

This type of apparatus may be required to detect load current with a high degree of accuracy. The device described in Patent Literature 1 is configured to temperature correct a detected load current value. Such temperature correction by itself may fail to achieve highly accurate detection of load current.

SUMMARY

It is an object of the present disclosure to provide an overcurrent protection apparatus that is capable of acquiring energization state of the load current with a high accuracy.

According to one aspect of the present disclosure, an overcurrent protection apparatus that protects, from overcurrent, a load drive system including a load circuit having an electric load and a semiconductor switch electrically connected to the load circuit so as to control a drive of the load circuit is provided. The overcurrent protection apparatus includes: an energization state acquisition part that is configured to acquire an energization state of load current flowing through the semiconductor switch and the load circuit when the semiconductor switch is ON; a change part that is configured to change an acquisition condition of the energization state at the energization state acquisition part in accordance with a driving state of the load circuit; and a protection operator that is configured to execute overcurrent protective operation of protecting the load drive system from the overcurrent based on the energization state acquired by the energization state acquisition part.

According to the configuration, the change part changes the acquisition condition for the energization state at the energization state acquisition part in accordance with the driving state (for example, an acquired value, an expected value, a command value, or the like of the load current) of the load circuit. The acquisition condition at the energization state acquisition part is thus set in accordance with the driving state of the load circuit. The energization state acquisition part accordingly acquires the energization state of the load current under the acquisition condition set in accordance with the driving state of the load circuit. Therefore, according to the configuration, it may be possible to acquire the energization state of the load current with a higher degree of accuracy.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Embodiment

An embodiment of the present disclosure will be described with reference to the drawings. Various modifications applicable to the embodiment will be described collectively as modification examples after description of the entire embodiment.

Figure 1:
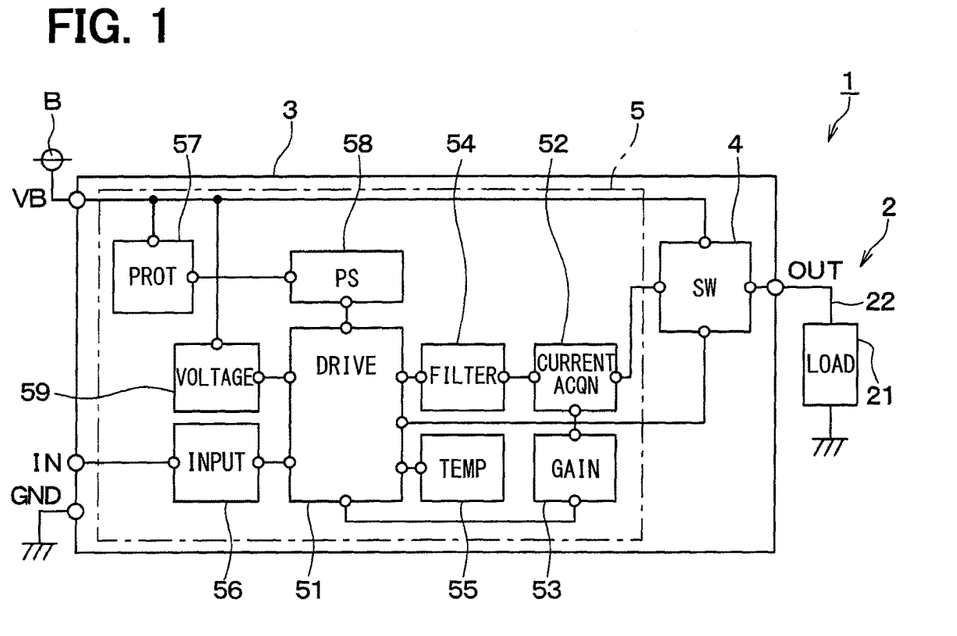
FIG. 1 is a block diagram depicting a schematic circuit configuration of a load drive system according to an embodiment.

With reference to FIG. 1, a load drive system 1 includes a load circuit 2 and a control circuit 3. The control circuit 3 is electrically connected to the load circuit 2 to control drive of the load circuit 2 in accordance with a control signal received from an electronic control unit (ECU) not depicted. Specifically, the control circuit 3 includes a semiconductor switch 4 and a device drive circuit 5. The respective parts will be described below in terms of their configurations.

The load circuit 2 includes an electric load 21 and wiring 22 electrically connected with each other. Specifically, the electric load 21 is electrically connected to an output terminal OUT of the control circuit 3 via the wiring 22 serving as a wire harness. The control circuit 3 includes an input terminal IN electrically connected to the ECU not depicted. The control circuit 3 includes a power terminal VB electrically connected to a power supply B. The control circuit 3 includes a ground terminal GNU that is grounded.

The semiconductor switch 4 is a power semiconductor element having a switching function (for example, a metal-oxide-semiconductor field-effect transistor (MOSFET), an insulated gate bipolar transistor (IGBT), or the like), and is electrically connected to the load circuit 2 via the output terminal OUT. The semiconductor switch 4 is electrically connected to the power terminal VB and the device drive circuit 5. The semiconductor switch 4 is turned ON and OFF in accordance with various signals received from the device drive circuit 5 so as to control drive of the load circuit 2 (that is, energization of load current). The "load current" flows from the power supply B to the load circuit 2 via the semiconductor switch 4 in the ON state.

The device drive circuit 5 according to the present embodiment is configured to protect the load drive system 1 from overcurrent. The device drive circuit 5 according to the present embodiment may correspond to an overcurrent protection apparatus. Specifically, the device drive circuit 5 includes a drive controller 51, a current value acquisition part 52, a gain switches 53, a filter circuit 54, a temperature corrector 55, an input circuit 56, a protection circuit 57, a power supply circuit 58, and a power supply voltage detection circuit 59.

The drive controller 51 is electrically connected to the semiconductor switch 4 so as to transmit various signals to the semiconductor switch 4. Specifically, the drive controller 51 generates a drive control signal for control of turning ON and OFF the semiconductor switch 4 in accordance with a control signal received by the input terminal N of the control circuit 3, and transmit the drive control signal to the semiconductor switch 4.

The drive controller 51 is electrically connected to the semiconductor switch 4 via the current value acquisition part 52 and the filter circuit 54. Specifically, the drive controller 51 is electrically connected to the current value acquisition part 52 via the filter circuit 54 so as to acquire an energization state of the load current (that is, so as to detect the load current). Furthermore, the drive controller 51 according to the present embodiment executes overcurrent protective operation of protecting the load drive system 1 from overcurrent in accordance with the energization state of the load current acquired by the current value acquisition part 52. The drive controller 51 according to the present embodiment may correspond to a protection operator.

Specifically, the drive controller 51 acquires an "added/subtracted value" in accordance with each energization state of the load current acquired by the current value acquisition part 52 to be described later, calculate an "integrated value" by integrating such added/subtracted values, and execute overcurrent protective operation in accordance with the integrated value. The drive controller 51 switches OFF the drive control signal even if the control signal is ON when the integrated value increases and reaches a predetermined "determination threshold", to stop the semiconductor switch 4. As described above, the drive controller 51 acquires the added/subtracted value and the integrated value in accordance with the energization state of the load current, to achieve overcurrent protective operation.

The current value acquisition part 52 according to the present embodiment acquires an energization state of load current. The current value acquisition part 52 may correspond to an energization state acquisition part. Specifically, the current value acquisition part 52 receives, from the semiconductor switch 4, an electric signal corresponding to the energization state of the load current, and convert or amplify the electric signal, to acquire an output signal (specifically, a voltage signal) corresponding to the energization state of the load current.

In an exemplary case where the semiconductor switch 4 outputs sense current corresponding to 1/N (N>1) times of the load current, the current value acquisition part 52 has a current-voltage conversion function of converting the sense current received from the semiconductor switch 4 to voltage. In an alternative case where the semiconductor switch 4 outputs voltage corresponding to the load current (for example, voltage by a shunt resistance or drain-source voltage), the current value acquisition part 52 has a voltage amplification function.

The current value acquisition part 52 is further controlled by the drive controller 51 via the gain switcher 53 so as to change a gain for conversion or amplification of the electric signal. Specifically, the current value acquisition part 52 is electrically connected to the drive controller 51 via the gain switcher 53. The gain switcher 53 according to the present embodiment sets an acquisition condition (that is, the gain) for the energization state of the load current at the current value acquisition part 52 convertibly in accordance with the driving state of the load circuit 2 (specifically, the acquired value or the expected value of the load current). The gain switcher 53 according to the present embodiment may correspond to a change part or a converter.

The filter circuit 54 removes a noise component (for example, a high-frequency noise component) in the output signal from the current value acquisition part 52 and transmits the output signal not including the noise component to the drive controller 51. The drive controller 51 causes an internal AD converter to AD convert a signal received via the filter circuit 54, to acquire a digital signal corresponding to the load current.

The drive controller 51 is electrically connected to the temperature corrector 55 configured to temperature correct load current. The temperature corrector 55 acquires temperature of the semiconductor switch 4 and transmits, to the drive controller 51, a correction value corresponding to the acquired temperature. The drive controller 51 corrects the digital signal acquired by the AD conversion with the correction value acquired from the temperature corrector 55.

The drive controller 51 is electrically connected to the input terminal IN via the input circuit 56. The drive controller 51 is also electrically connected to the power terminal VB via the protection circuit 57 and the power supply circuit 58. The protection circuit 57 has an abnormal voltage protective function such as overvoltage protection of suppressing application of overvoltage to the drive controller 51, and reverse connection protection of preventing application of abnormal power supply voltage to the drive controller 51 due to reverse connection of the power supply B. The power supply circuit 58 generates power supply voltage for operation of the drive controller 51, or the like.

The power supply voltage detection circuit 59 is disposed between the power terminal VB and the drive controller 51. The power supply voltage detection circuit 59 is electrically connected to the drive controller 51 so as to transmit, to the drive controller 51, a signal corresponding to power supply voltage received by the power terminal VB.

The device drive circuit 5 includes a basic configuration apart from a main part described herein (that is, a part relevant to the gain switcher 53). The basic configuration is similar to a configuration described in JP 2013-62976 A, JP 2013-85443 A, U.S. Pat. No. 9,225,158, and CN 103001202 A. As to specific description of the basic configuration, description of these publications can thus appropriately be incorporated by reference.

Figure 2:
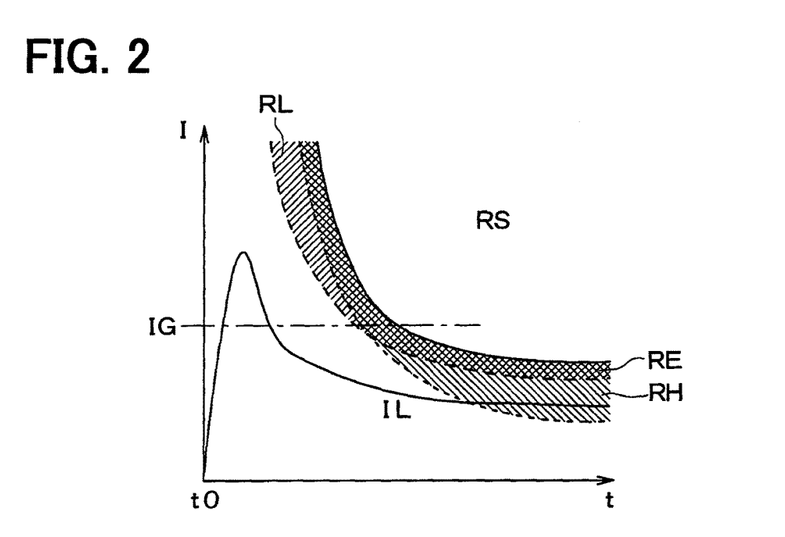
FIG. 2 is a diagram showing outlined operation of the load drive system depicted in FIG. 1.

Operation and effects of the configuration according to the present embodiment will be described below. FIG. 2 indicates a relation between a load current property and a wire protection property of the load drive system 1 according to the present embodiment. This graph has an ordinate axis indicating a current value I [A] and a transverse axis indicating an elapsed period t [s] from energization start time t0 of the load current. The graph includes a curved line IL indicating a load current property in a normal state (that is, where no overcurrent is generated). This load current property relates to variation with time of the load current flowing through the load circuit 2 (specifically, the wiring 22) at and after the energization start time to.

The load circuit 2 according to the present embodiment has a load current property indicated in FIG. 2, and the current value decreases toward a predetermined value after relatively large inrush current flows. The graph has a region RS indicating an energization region estimated to have increase in temperature of the wiring 22. The region RS has a boundary line at the lowest current, which will be referred to as a "protection boundary line". Specifically, the load drive system 1 according to the present embodiment prevents an operation region of the load circuit 2 from entering the region RS, to inhibit a difficulty (specifically, fuming or the like) caused by increase in temperature of the wiring 22. As indicated by the region RS in FIG. 2, the wiring 22 has quicker increase in temperature with larger current.

The graph also has a region RL indicating a current value acquisition error along the protection boundary line in a case where the current value acquisition part 52 has a gain G1. Similarly, the graph has a region RH indicating a current value acquisition error along the protection boundary line in a case where the current value acquisition part 52 has a gain G2 (G2>G1). The "current value acquisition error" indicates an error between actual load current and a value obtained by converting AD converted output voltage of the filter circuit 54 to load current. The "current value acquisition error" may be referred to as a "detection error". As indicated in FIG. 2, the current value acquisition error increases in a large current region when the current value acquisition part 52 has the low gain value G1. In contrast, the current value acquisition error increases in a small current region when the current value acquisition part 52 has the high gain G2.

In the present embodiment, in a case where the load current is less than switching current IG, the current value acquisition part 52 has the low gain value G1. In another case where the load current is more than the switching current IG, the current value acquisition part 52 has the high gain value G2. The current value acquisition part 52 has the gain switched between the value G1 and the value G2 with respect to the switching current IG. FIG. 2 has a region RE where the current value acquisition error is appropriately suppressed in both the large current region and the small current region. The region RE having a band shape along the protection boundary line as indicated in FIG. 2 may be referred to as a "semiconductor fuse property". The region RE corresponds to a region where the region RL and the region RH are overlapped each other.

Figure 3:
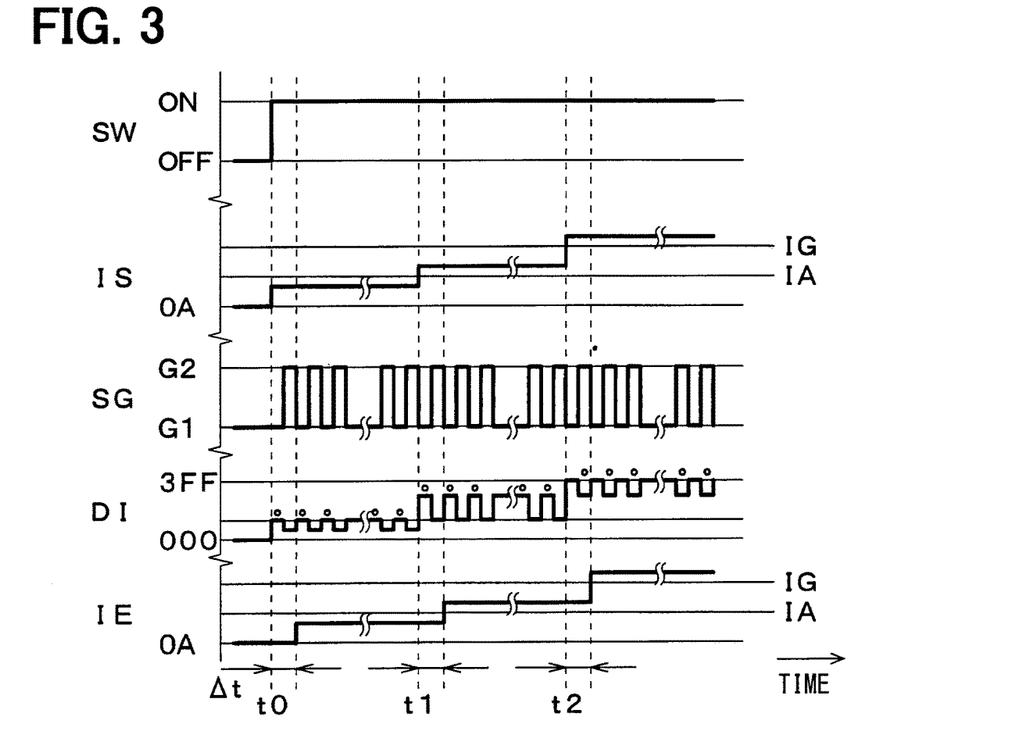
FIG. 3 is a timing chart showing the outlined operation of the load drive system depicted in FIG. 1.

FIG. 3 is a timing chart of operation of the load drive system 1 according to the present embodiment. Each of the timing charts in FIG. 3 and the following figures has a transverse axis indicating elapse of time. These timing charts and description thereof disregard "delay" normally caused in control, for simplification of depiction and the description.

In these timing charts, reference sign "SW" denotes a driving signal. Even under a condition where the driving signal is ON, the drive controller 51 executing overcurrent protective operation may possibly turn OFF the drive control signal. As described above, the driving signal serves as an ON/OFF command signal for the semiconductor switch 4 transmitted from the ECU (not depicted), and does not indicate an actual ON/OFF state of the semiconductor switch 4. Reference sign "IS" denotes an actual value of the load current flowing through the semiconductor switch 4.

Reference sign "SG" denotes a gain switching signal transmitted from the drive controller 51 to the current value acquisition part 52 via the gain switcher 53. Specifically, in a case where the gain switching signal has the value "G1", the current value acquisition part 52 has the gain set to the value G1. In another case where the gain switching signal has the value "G2", the current value acquisition part 52 has the gain set to the value G2. The gain switching signal may also be referred to as a "gain select signal" or a "gain setting signal". The present embodiment provides the gain switching signal SG having a rectangular wave form at a constant period.

Reference sign "DI" denotes the digital signal generated by the internal AD converter of the drive controller 51 in accordance with the load current. The digital signal may be referred to as a "digital read value". The digital read value DI is a digital value obtained by AD converting a signal received via the filter circuit 54 at the internal AD converter of the drive controller 51. The digital value according to the present embodiment exemplarily has ten bits (000 to 3FF). Reference sign "IE" denotes an estimated value of the load current by the drive controller 51 in accordance with the digital read value DI. The value IE in the figures is obtained by converting, to a current value [A], the digital read value DI selected by the drive controller 51 for overcurrent protective operation, and corresponds to the integrated value.

Reference sign "IA" denotes an addition threshold. Specifically, the added/subtracted value is set to a positive value (added value) when the load current exceeds the addition threshold. The integrated value then increases in this case. Reference sign "IG" corresponds to the switching current. In a case where the load current is less than the switching current IG, the drive controller 51 selects the digital read value DI corresponding to the gain switching signal having the value "G1", and executes overcurrent protective operation. In another case where the load current is more than the switching current IG, the drive controller 51 selects the digital read value DI corresponding to the gain switching signal having the value "G2", and executes overcurrent protective operation. When the load current is equal to the switching current IG, the drive controller 51 is configured to execute selection similar to the most recent selection, for suppression of hunting.

As indicated in FIG. 3, the energization state of the load current is acquired repeatedly at a sampling period $\Delta t$. The sampling period $\Delta t$ corresponds to a single period of the gain switching signal SG.

The digital read value DI is not generated yet during the initial sampling period $\Delta t$ from the time t0 when the semiconductor switch 4 is turned ON. The drive controller 51 thus selects the digital read value DI in accordance with the expected value of the load current. Specifically, on the basis of the load current property indicated in FIG. 2, the load current during the initial sampling period $\Delta t$ is expected to be less than the switching current IG. The drive controller 51 thus selects the digital read value DI corresponding to the gain switching signal having the "G1" value during the initial sampling period $\Delta t$ (see a circle symbol in FIG. 3).

The load current is acquired at least once after elapse of the initial sampling period $\Delta t$. The digital read value DI may thus be selected from the expected value of the load current and the formerly (for example, most recently) acquired value of the load current. The drive controller 51 then selects, as the digital read value DI, a larger one of the expected value of the load current and the most recently acquired value of the load current.

Specifically, in exemplary operation indicated in FIG. 3, the load current is approximate to steady current or is less than the addition threshold IA from the time t0 to time t1. The load circuit 2 is driven continuously in this case. Both the expected value and the acquired value of the load current are less than the switching current IG during this period. The drive controller 51 thus selects the digital read value DI corresponding to the gain switching signal having the "G1" value (see the circle symbol in FIG. 3).

It is supposed that current exceeding the addition threshold IA is generated from the time t1 in the present exemplary operation. The acquired value of the load current is less than the switching current IG. In this case, the drive controller 51 selects the digital read value DI corresponding to the gain switching signal having the "G1" value (see the circle symbol in FIG. 3), and acquires the added/subtracted value in accordance with the digital read value DI. The drive controller 51 also adds the added/subtracted value to the integrated value to execute overcurrent protective operation.

It is supposed that current exceeding the switching current IG is generated from time t2 in the present exemplary operation. In this case, the drive controller 51 selects the digital read value DI corresponding to the gain switching signal having the "G2" value (see the circle symbol in FIG. 3), and acquires the added/subtracted value in accordance with the digital read value DI. The drive controller 51 also adds the added/subtracted value to the integrated value to execute overcurrent protective operation.

Figure 4:
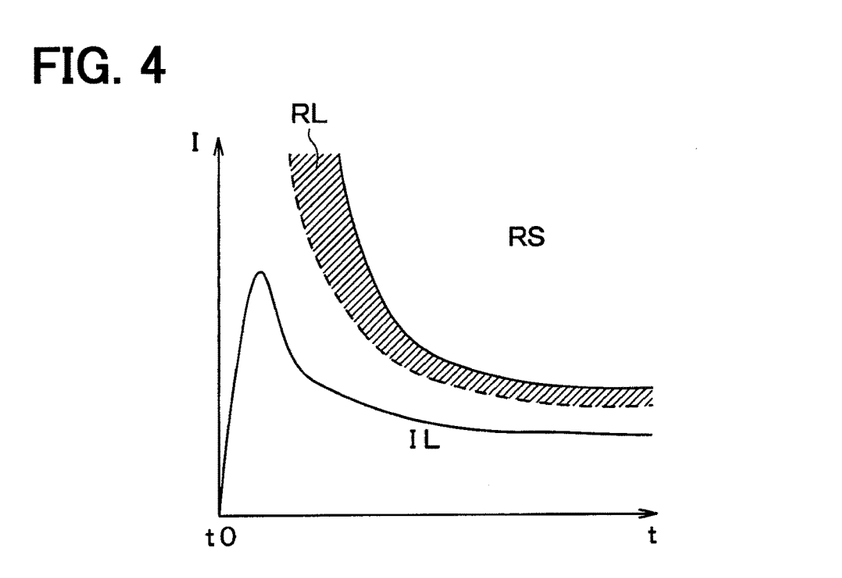
FIG. 4 is a diagram showing outlined operation of a load drive system according to a comparative example.
Figure 5:
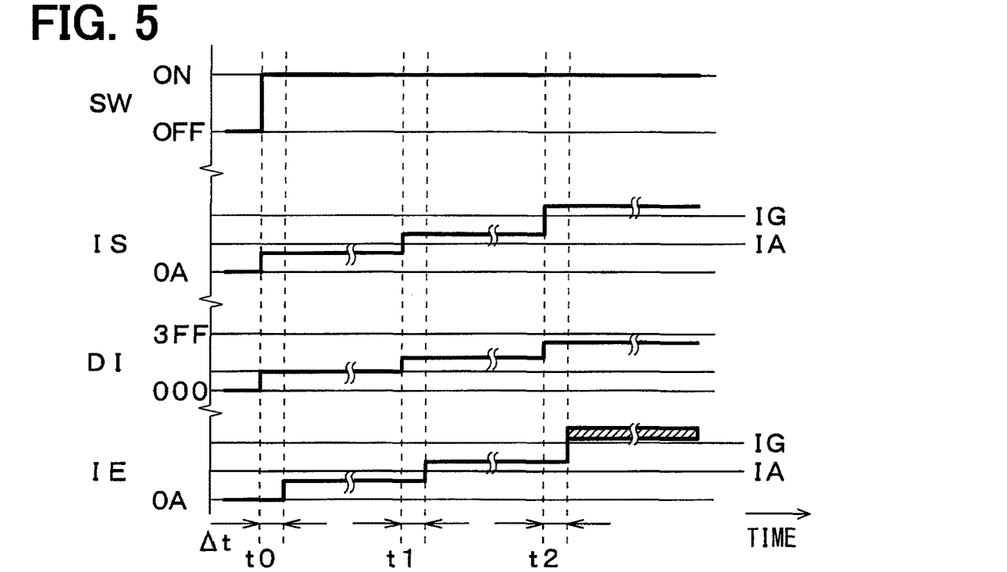
FIG. 5 is a timing chart indicating outlined operation of a load drive system according to another comparative example.
Figure 6:
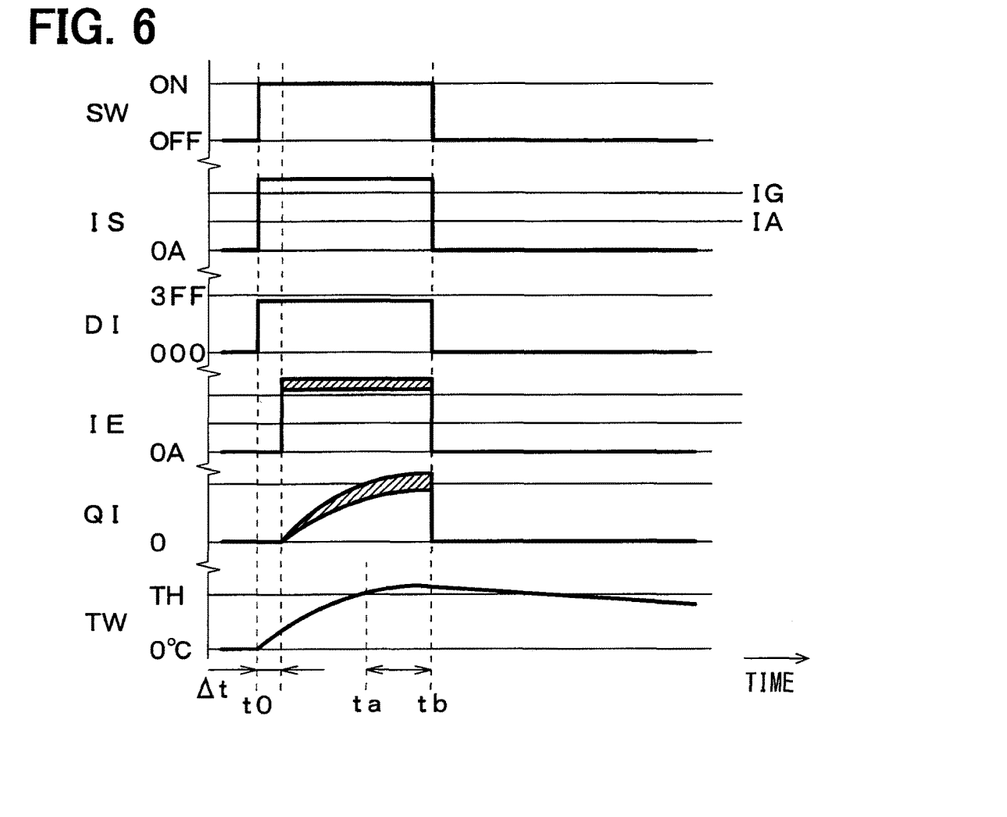
FIG. 6 is a timing chart indicating outlined operation of a load drive system according to still another comparative example.

FIG. 4 to FIG. 6 each relate to a comparative example in which the gain at the current value acquisition part 52 has only the value G1 for small current. Similarly to FIG. 2, FIG. 4 indicates a relation between a load current property and a wire protection property. FIG. 5 is a timing chart upon transition of load current, similarly to the timing chart in FIG. 3. FIG. 6 is a timing chart of a case where large current flows from the time t0 when the semiconductor switch 4 is turned ON. FIG. 6 includes reference sign "QI" indicating the integrated value calculated by the drive controller 51. FIG. 6 also includes reference sign "TW" indicating temperature of the wiring 22.

FIG. 5 and FIG. 6 further indicate influence of the current value acquisition error by means of diagonal hatching. For example, the estimated value of the load current by the drive controller 51 falls within the range of the diagonal hatching at and after the time t2 in FIG. 5.

As indicated by the region RL in FIG. 4, the gain G1 enables highly accurate acquisition of the energization state of the load current in the small current region. The energization state of the load current is thus acquired with high accuracy from the time t0 to the time t1 while the load current falls within the small current region. The gain G1, however, increases the current value acquisition error along the protection boundary line in the large current region. As compared with the error up to the time t2, the current value acquisition error thus increases at and after the time t2 when the load current exceeds the switching current IG.

As indicated in FIG. 6, when large current regarded as overcurrent flows from the time t0 when the semiconductor switch 4 is turned ON, the current value acquisition error increases as the load current increases. In this case, the added/subtracted value may be set to be smaller than an original value due to the influence of the current value acquisition error. The integrated value does not reach the determination threshold and the load current is not broken even when the wiring 22 has temperature reaching predetermined protection temperature TH at time ta. Specifically, large current continuously flows to the wiring 22 having temperature reached the protection temperature TH from the time ta to time tb when the integrated value reaches the determination threshold and the semiconductor switch 4 is forcibly turned OFF. In contrast, it may be possible to appropriately prevent occurrence of such a difficulty.

Figure 7:
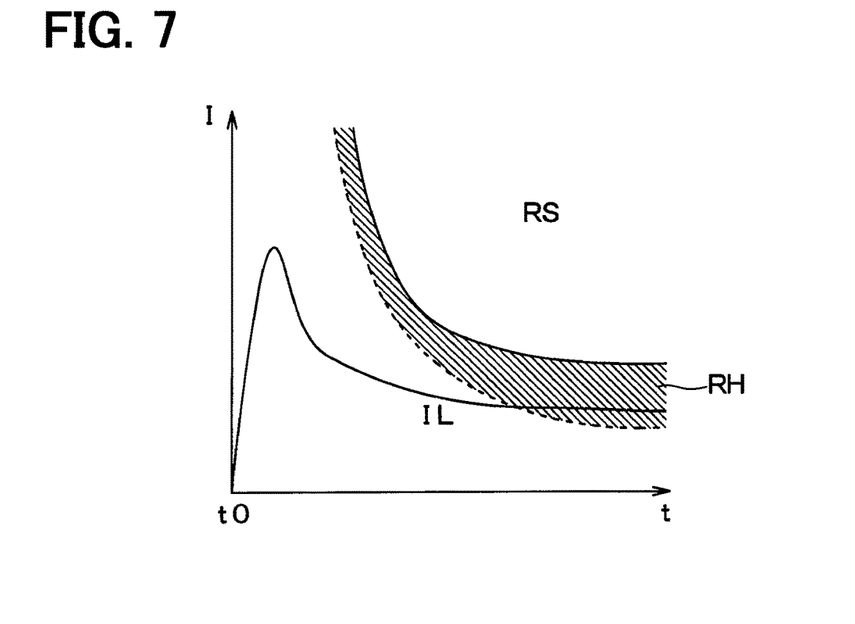
FIG. 7 is a diagram showing outlined operation of a load drive system according to a different comparative example.
Figure 8:
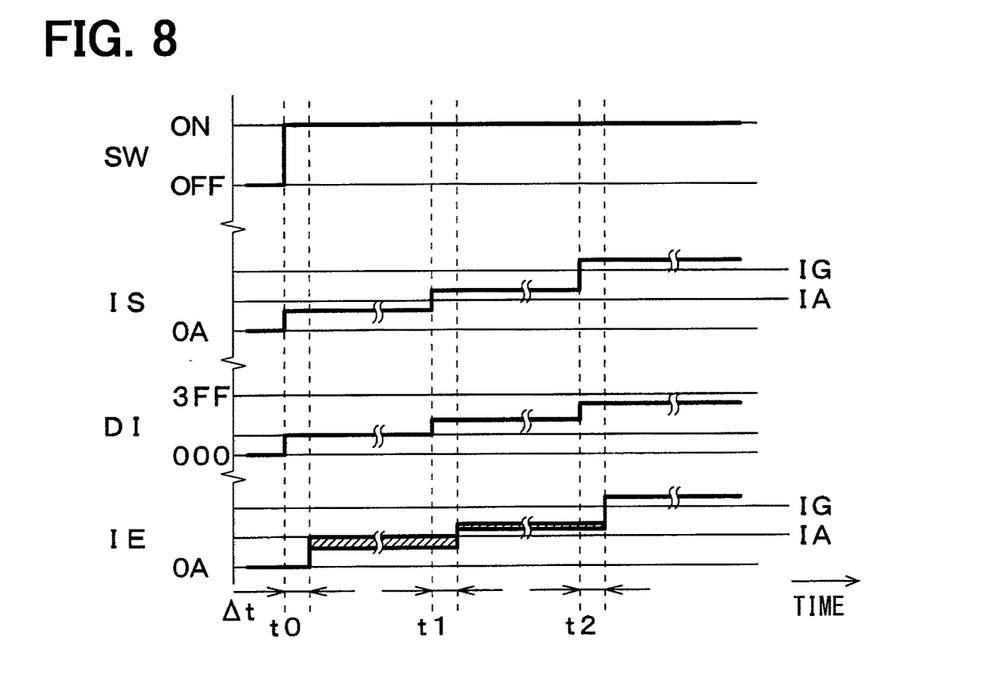
FIG. 8 is a timing chart indicating outlined operation of a load drive system according to a different comparative example.
Figure 9:
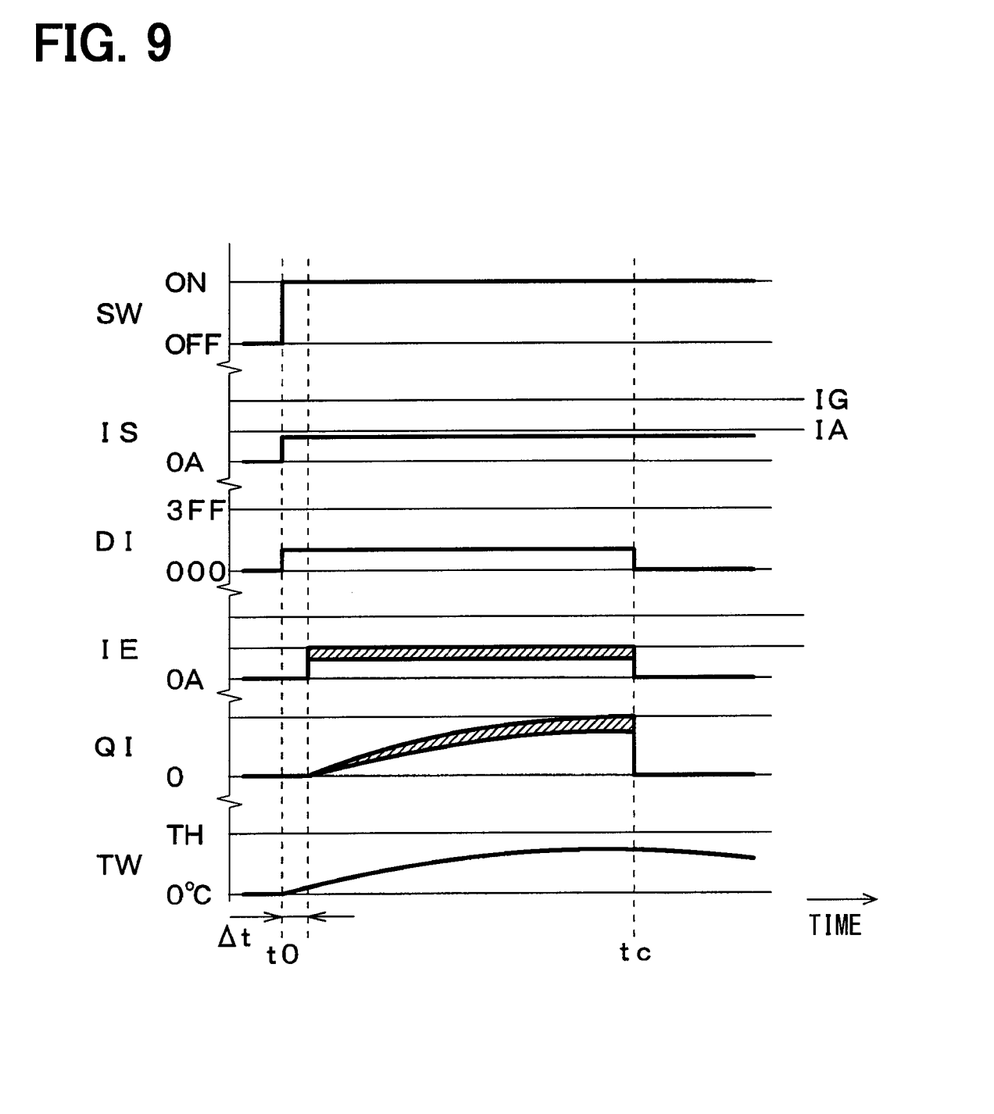
FIG. 9 is a timing chart indicating outlined operation of a load drive system according to a different comparative example.

FIG. 7 to FIG. 9 each relate to a comparative example in which the gain at the current value acquisition part 52 has only the value G2 for large current. Similarly to FIG. 2, FIG. 7 indicates a relation between a load current property and a wire protection property. FIG. 8 is a timing chart upon transition of load current, similarly to the timing chart in FIG. 3. FIG. 9 is a timing chart of a case where normal load current flows in the small current region from the time t0 when the semiconductor switch 4 is turned ON.

As indicated with the region RH in FIG. 7, according to the gain G2, it may be possible to acquire the energization state of the load current in the large current region with high accuracy. The gain G2 increases the current value acquisition error along the protection boundary line in the small current region. In the timing chart of FIG. 8, the current value acquisition error thus increases from the time t0 to the time t1 while the load current falls within the small current region.

As indicated in FIG. 7, even in a case where normal load current within the small current region flows, the curved line IL indicating the load current property is overlapped with the region RH indicating the current value acquisition error along the protection boundary line. The load current may thus be broken erroneously. As indicated in FIG. 9, the added/subtracted value may be set to be larger than the original value due to the influence of the current value acquisition error. Even when the wiring 22 has temperature not reaching the predetermined protection temperature TH, the integrated value reaches the determination threshold at the time tb to forcibly turn OFF the semiconductor switch 4. In contrast, according to the present embodiment, it may be possible to appropriately inhibit such a difficulty.

As described above, the gain switcher 53 according to the present embodiment changes the gain at the current value acquisition part 52 in accordance with the driving state of the load circuit 2. The gain at the current value acquisition part 52 is thus set in accordance with the driving state of the load circuit 2. The current value acquisition part 52 accordingly coverts or amplifies an electric signal received from the semiconductor switch 4 with the gain set in accordance with the driving state of the load circuit 2. Therefore, according to the configuration, it may be possible to acquire the energization state of the load current with a higher degree of accuracy.

The drive controller 51 executes overcurrent protective operation in accordance with the energization state of the load current acquired by the current value acquisition part 52 with the gain set by the gain switcher 53. According to this configuration, it may be possible to perform an accurate overcurrent protection operation.

Modifications

The present disclosure is not limited to the specific exemplification described in the above embodiment. Specifically, the above embodiment may be modified where appropriate. Typical modification examples will be described below. The following description of the modification examples will refer only to differences from the above embodiment. Identical or similar parts in the above embodiment and the modification examples are denoted by identical reference signs. As to the configuration elements denoted by the reference signs identical to those in the above embodiment, the description of the above embodiment may thus appropriately be incorporated by reference in the following description of the modification examples, unless technical inconsistency or particularly additional description is provided.

The present disclosure is not limited to the specific configurations described in the above embodiment. For example, the drive controller 51 may be configured as a so-called microcomputer including a CPU, a ROM, a rewritable ROM, a RAM, and the like not depicted. In this case, the drive controller 51 may cause the CPU to read out and execute a program stored in the ROM or the rewritable ROM so as to achieve the operation described above. The rewritable ROM in the drive controller 51 further stores a table for acquisition of the added/subtracted value, a table for acquisition of an initial value of the integrated value and the determination threshold, and the like. The RAM in the drive controller 51 stores results of the added/subtracted value and the integrated value thus acquired.

The control circuit 3 including the drive controller 51 may alternatively be configured as a digital circuit or an application specific integrated circuit (ASIC) such as a gate array. The control circuit 3 configured as the digital circuit is exemplified in JP 2011-182604 A (corresponding to U.S. Pat. No. 8,441,767, DE 102011000897 A, and ON 102195264 A), JP 2013-62976 A (corresponding to US 2013/0063850 A, and ON 103001202 A).

The "load current" may have a positive or negative value. The load current has a negative value in an exemplary case where the power terminal VB of the control circuit 3 is electrically connected to a negative electrode of the power supply B. In this case, the load current has a positive value and flows from the load circuit 2 to the negative electrode of the power supply B via the semiconductor switch 4.

The current value acquisition part 52 may optionally have both the current-voltage conversion function and the amplification function.

The "driving state" of the load circuit 2 referred to for change of the gain is not limited to the acquired value or the expected value of the load current. For example, a command value of the load current, which is acquired by the drive controller 51 in accordance with a control signal transmitted from the ECU not depicted, may alternatively be used for change of the gain. Specifically, the gain may be changed in accordance with a larger one of the command value of the load current and the most recently acquired value of the load current.

Figure 10:
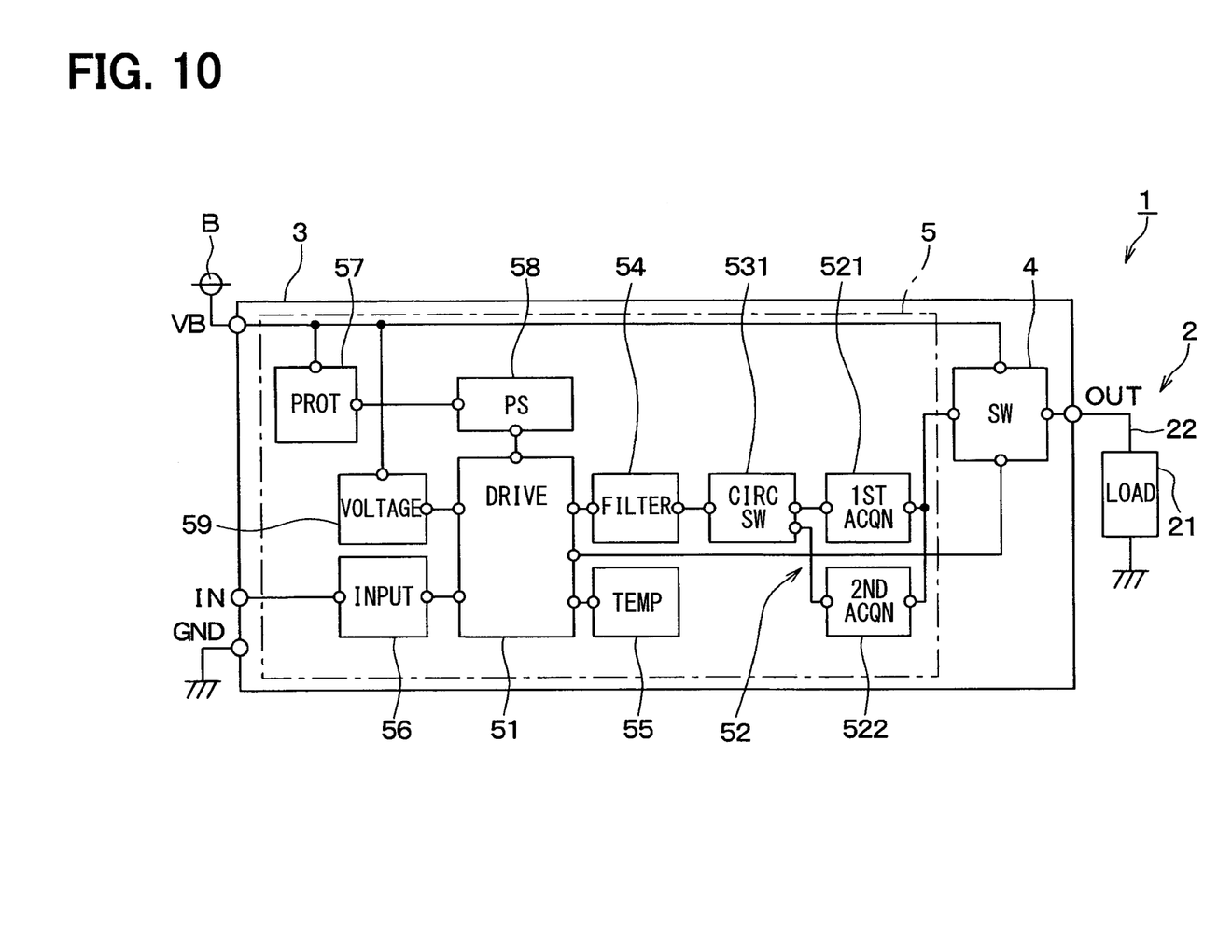
FIG. 10 is a block diagram depicting a schematic circuit configuration of a load drive system according to a modification example.

FIG. 10 depicts the current value acquisition part 52 according to a modified example, including a first acquisition part 521 and a second acquisition part 522. The first acquisition part 521 and the second acquisition part 522 are electrically connected in parallel with each other to the semiconductor switch 4. The first acquisition part 521 and the second acquisition part 522 are also electrically connected in parallel with each other to a circuit switcher 531. The first acquisition part 521 and the second acquisition part 522 are provided in parallel with each other, and are disposed between the semiconductor switch 4 and another semiconductor switch 4. The circuit switcher 531 is electrically connected to the drive controller 51 via the filter circuit 54.

The first acquisition part 521 receives an electric signal corresponding to the energization state of the load current, and converts or amplifies the electric signal. The second acquisition part 522 receives an electric signal corresponding to the energization state of the load current, and converts or amplifies the electric signal with a gain different from that of the first acquisition part 521. The circuit switcher 531 according to the present modification example selects one of the energization state acquired by the first acquisition part 521 and the energization state acquired by the second acquisition part 522. The circuit switcher 531 according to the present modification example may correspond to a change part.

Figure 11:
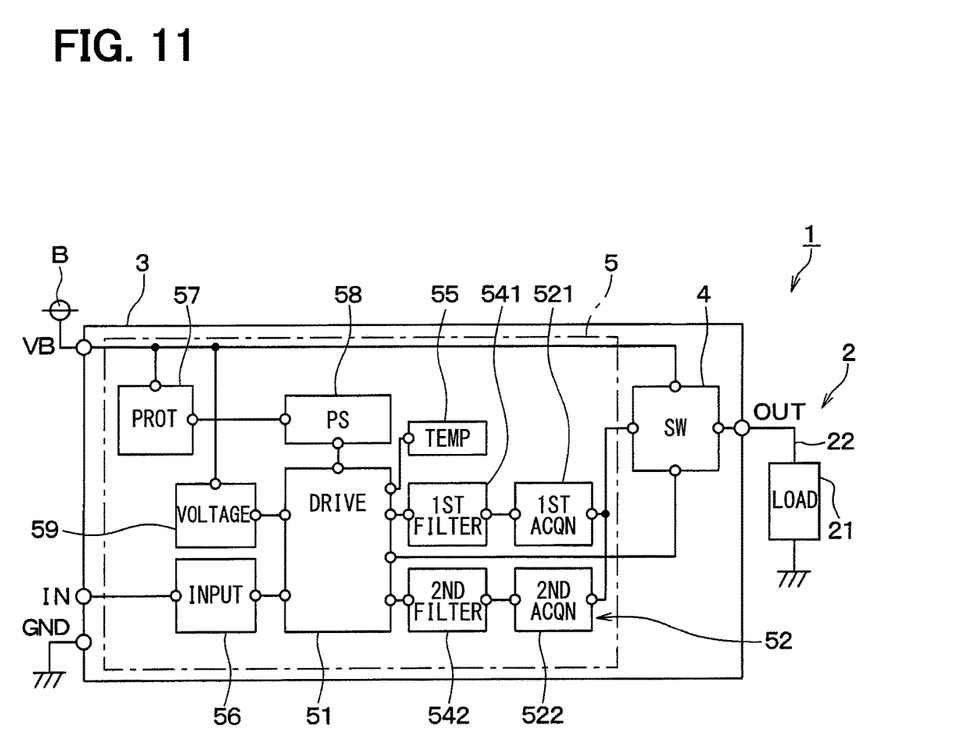
FIG. 11 is a block diagram depicting a schematic circuit configuration of a load drive system according to another modification example.

FIG. 11 depicts the current value acquisition part 52 according to a modification example, including the first acquisition part 521 and the second acquisition part 522. The first acquisition part 521 and the second acquisition part 522 are electrically connected in parallel with each other to the semiconductor switch 4. The first acquisition part 521 is electrically connected to the drive controller 51 via a first filter circuit 541. The second acquisition part 522 is electrically connected to the drive controller 51 via a second filter circuit 542. The drive controller 51 according to the present modification example selects, in accordance with the driving state of the load circuit 2, one of an AD converted value of an electric signal acquired via the first acquisition part 521 and the first filter circuit 541, and an AD converted value of an electric signal acquired via the second acquisition part 522 and the second filter circuit 542. The drive controller 51 according to the present modification example may correspond to a change part.

Any one of the modification examples described above achieves effects similar to those of the above embodiment.

The gain is not limitedly set to have two values. The gain may alternatively have three or more values. For example, there may be provided a gain GL for small current, a gain GM for medium current, and a gain GH for large current. In FIG. 10 and FIG. 11, the number of the current value acquisition parts 52 connected in parallel and the like will be changed appropriately in accordance with the number of values of the gains.

Change of the gain may be replaced with change in conversion condition (that is, resolution) of the internal AD converter of the drive controller 51. The gain switcher 53 depicted in FIG. 1 is not necessarily provided in this case.

The device drive circuit 5 functioning as an overcurrent protection apparatus may mainly protect the load circuit 2 from overcurrent, specifically, protect the wiring 22. In this case, the semiconductor switch 4 may be configured as an intelligent power device known and commercially available, having an overheat protective function and/or an overcurrent protective function. The device drive circuit 5 may alternatively protect the load circuit 2 from overcurrent as well as protect the semiconductor switch 4 from overcurrent.

Therefore, according to the present disclosure, an overcurrent protection apparatus is configured to protect an load drive system from overcurrent. The load drive system includes a load circuit having an electric load, and a semiconductor switch electrically connected to the load circuit so as to control a drive of the load circuit.

The overcurrent protection apparatus includes an energization state acquisition part, a change part, and a protection operator. The energization state acquisition part is configured to acquire an energization state of load current flowing through the semiconductor switch and the load circuit when the semiconductor switch is ON. The change part is configured to change an acquisition condition of the energization state at the energization state acquisition part in accordance with a driving state of the load circuit. The protection operator is configured to execute overcurrent protective operation of protecting the load drive system from the overcurrent based on the energization state acquired by the energization state acquisition part.

Furthermore, the energization state acquisition part may be configured to receive an electric signal corresponding to the energization state and convert or amplify the electric signal. In this case, the change part may be configured to change a gain for conversion or amplification of the electric signal by the energization state acquisition part. Specifically, the energization state acquisition part may be configured to covert or amplify the electric signal with the gain corresponding to the driving state of the load circuit in this case.

Furthermore, the energization state acquisition part may alternatively include a first acquisition part and a second acquisition part. In this case, the first acquisition part may be configured to receive an electric signal corresponding to the energization state and convert or amplify the electric signal with a first gain. The second acquisition part may be configured to receive the electric signal and convert or amplify the electric signal with a gain (corresponding to a second gain) different from that of the first acquisition part. The change part may be configured to select one of the energization state (corresponding to a first energization state) acquired by the first acquisition part and the energization state (corresponding to a second energization state) acquired by the second acquisition part. The energization state includes the first energization state and the second energization state in this case.

In the above configuration, the change part changes the acquisition condition for the energization state at the energization state acquisition part in accordance with the driving state (for example, an acquired value, an expected value, a command value, or the like of the load current) of the load circuit. The acquisition condition at the energization state acquisition part is thus set in accordance with the driving state of the load circuit. The energization state acquisition part accordingly acquires the energization state of the load current under the acquisition condition set in accordance with the driving state of the load circuit. The above configuration therefore enables acquisition of the energization state of the load current with a higher degree of accuracy.

The modification examples are not limited to those exemplified above. Furthermore, some of the modification examples may be combined appropriately. Moreover, entirety or part of the above embodiment may be combined with entirety or part of any one of the modification examples.

While the embodiments, the configurations, the aspects of an overcurrent protection apparatus have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. An overcurrent protection apparatus that protects, from overcurrent, a load drive system including (i) a load circuit having an electric load and (ii) a semiconductor switch electrically connected to the load circuit so as to control a drive of the load circuit, the overcurrent protection apparatus comprising:

an energization state acquisition part that is configured to acquire an energization state of load current flowing through the semiconductor switch and the load circuit when the semiconductor switch is ON;

a change part that is configured to change an acquisition condition of the energization state at the energization state acquisition part in accordance with a driving state of the load circuit, the acquisition condition including a gain for conversion or amplification of an electric signal corresponding to the energization state; and a protection operator that is configured to execute overcurrent protective operation of protecting the load drive system from the overcurrent based on the energization state acquired by the energization state acquisition part.

2. The overcurrent protection apparatus according to claim 1, wherein:

the energization state acquisition part is configured to receive the electric signal corresponding to the energization state and to convert or amplify the electric signal based on the gain set by the change part.

3. The overcurrent protection apparatus according to claim 1, wherein:

the energization state acquisition part includes
a first acquisition part that is configured to receive the electric signal corresponding to the energization state and to convert or amplify the electric signal with a first gain, and
a second acquisition part that is configured to receive the electric signal and to convert or amplify the electric signal with a second gain different from the first gain of the first acquisition part;

the energization state includes a first energization state acquired by the first acquisition part and a second energization state acquired by the second acquisition part; and the change part is configured to select one of the first energization state and the second energization state.

4. The overcurrent protection apparatus according to claim 1, wherein the change part is configured to change the acquisition condition by switching the gain between a first gain value and a second gain value based on the driving state of the load circuit, the second gain value being greater than the first gain value.

5. The overcurrent protection apparatus according to claim 1, wherein:

the change part is configured to output a gain switching signal to the energization state acquisition part and to switch the gain switching signal between a first gain value and a second gain value based on the driving state of the load circuit, the second gain value being greater than the first gain value; and the energization state acquisition part is configured to receive the gain switching signal from the change part and to convert or amplify the electrical signal in accordance with the gain switching signal received from the change part.

6. An overcurrent protection apparatus that protects, from overcurrent, a load drive system including (i) a load circuit having an electric load and (ii) a semiconductor switch electrically connected to the load circuit so as to control a drive of the load circuit, the overcurrent protection apparatus comprising:

an energization state acquisition part that is configured to acquire an energization state of load current flowing through the semiconductor switch and the load circuit when the semiconductor switch is ON;

a change part that is configured to change an acquisition condition of the energization state at the energization state acquisition part in accordance with a driving state of the load circuit; and a protection operator that is configured to execute overcurrent protective operation of protecting the load drive system from the overcurrent based on the energization state acquired by the energization state acquisition part, wherein:

the energization state acquisition part includes a first acquisition part that is configured to receive an electric signal corresponding to the energization state and to convert or amplify the electric signal with a first gain, and a second acquisition part that is configured to receive the electric signal and to convert or amplify the electric signal with a second gain different from the first gain of the first acquisition part;

the energization state includes a first energization state acquired by the first acquisition part and a second energization state acquired by the second acquisition part; and the change part is configured to select one of the first energization state and the second energization state.

* * * * *